United States Patent
Von Novak

(10) Patent No.: US 9,142,999 B2
(45) Date of Patent: Sep. 22, 2015

(54) SYSTEMS, METHODS, AND APPARATUS FOR SMALL DEVICE WIRELESS CHARGING MODES

(71) Applicant: QUALCOMM Incorporated, San Diego, CA (US)

(72) Inventor: William H Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 13/676,024

(22) Filed: Nov. 13, 2012

(65) Prior Publication Data

US 2014/0015478 A1 Jan. 16, 2014

Related U.S. Application Data

(60) Provisional application No. 61/671,581, filed on Jul. 13, 2012.

(51) Int. Cl.
*H02J 7/00* (2006.01)
*H02J 7/02* (2006.01)

(52) U.S. Cl.
CPC ............... *H02J 7/025* (2013.01); *H02J 7/0004* (2013.01)

(58) Field of Classification Search
CPC ........ H02J 7/025; H01F 38/14; Y02T 90/122; B60L 11/182; Y02E 60/12
USPC ......................................................... 320/108
See application file for complete search history.

(56) References Cited

U.S. PATENT DOCUMENTS

| | | | |
|---|---|---|---|
| 6,934,167 B2 | 8/2005 | Jang et al. | |
| 7,948,208 B2 | 5/2011 | Partovi et al. | |
| 2007/0114967 A1* | 5/2007 | Peng | 320/101 |
| 2008/0084189 A1* | 4/2008 | Kim | 320/160 |
| 2008/0231368 A1 | 9/2008 | Suzaki et al. | |
| 2009/0033280 A1* | 2/2009 | Choi et al. | 320/108 |
| 2010/0181961 A1 | 7/2010 | Von Novak et al. | |
| 2010/0201312 A1 | 8/2010 | Kirby et al. | |
| 2010/0213895 A1 | 8/2010 | Keating et al. | |
| 2011/0221388 A1 | 9/2011 | Low et al. | |
| 2011/0227420 A1 | 9/2011 | Urano | |
| 2011/0260682 A1 | 10/2011 | Low et al. | |
| 2012/0104997 A1 | 5/2012 | Carobolante | |

FOREIGN PATENT DOCUMENTS

| | | |
|---|---|---|
| WO | 2008017818 A1 | 2/2008 |
| WO | 2008044875 A1 | 4/2008 |

OTHER PUBLICATIONS

International Search Report and Written Opinion—PCT/US2013/049763—ISA/EPO—Oct. 16, 2013.

\* cited by examiner

*Primary Examiner* — Arun Williams
(74) *Attorney, Agent, or Firm* — Knobbe, Martens, Olson & Bear LLP

(57) ABSTRACT

Systems, methods, and apparatus are disclosed for wirelessly charging devices that may not be able to communicate with a wireless charger. In one aspect, a wireless charging device is provided including a transmitter configured to wirelessly transmit power via a wireless field at a power level sufficient to charge one or more electronic devices according to one or more charging modes including at least a first charging mode in which the transmitter is configured to vary the power level of the transmitter based on feedback received from one of the one or more electronic devices and a second charging mode in which the power level is constant. The wireless charging device includes a sensor configured to obtain input for switching between the charging modes. The wireless charging device further includes a controller configured to switch between the first charging mode and the second charging mode in response to the input.

34 Claims, 9 Drawing Sheets

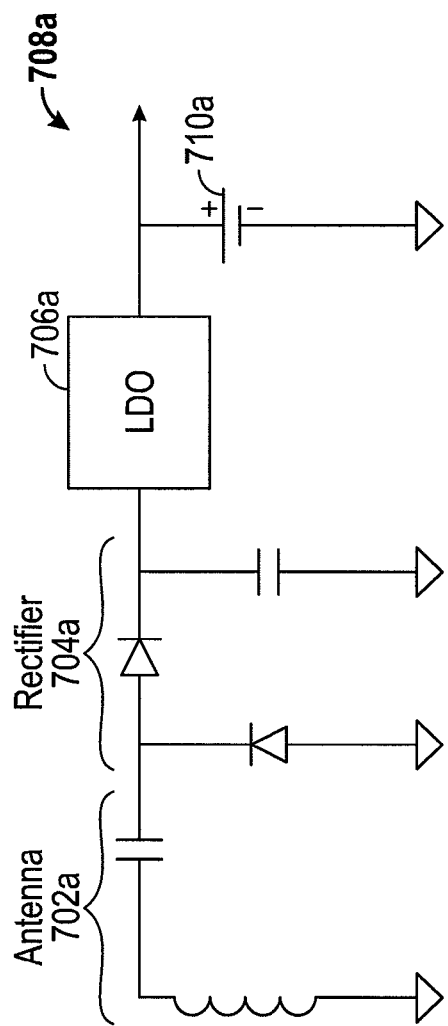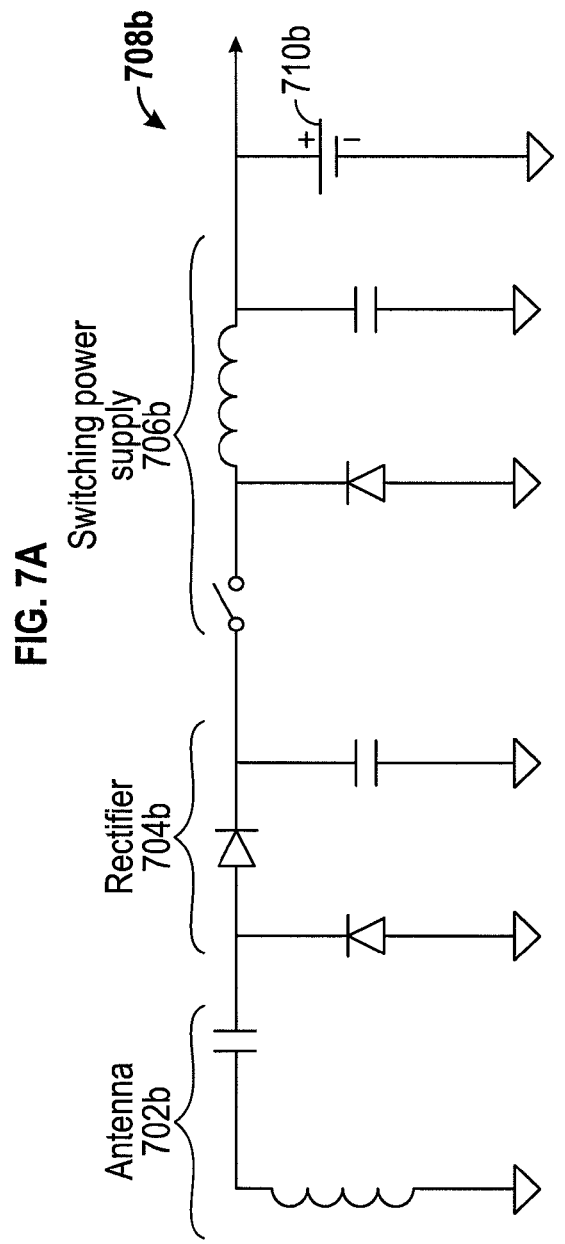
FIG. 7A
FIG. 7B

SYSTEMS, METHODS, AND APPARATUS FOR SMALL DEVICE WIRELESS CHARGING MODES

CROSS REFERENCE TO RELATED APPLICATIONS

This application claims priority and the benefit under 35 U.S.C. §119(e) to U.S. Provisional Patent Application No. 61/671,581 entitled "SYSTEMS, METHODS, AND APPARATUS FOR SMALL DEVICE WIRELESS CHARGING MODES" filed on Jul. 13, 2012, the disclosure of which is hereby incorporated by reference in its entirety.

FIELD

The present invention relates generally to wireless power. More specifically, the disclosure is directed to charging modes that may allow for additionally charging devices that may not be able to communicate with a wireless charging device.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a wireless charging device. The wireless charging device includes a transmitter configured to wirelessly transmit power via a wireless field at a power level sufficient to charge one or more electronic devices according to one or more charging modes. The one or more charging modes include at least a first charging mode in which the transmitter is configured to vary the power level of the transmitter based on feedback received from an electronic device of the one or more electronic devices and a second charging mode in which the power level is constant. The wireless charging device includes a sensor configured to obtain input for switching between the first charging mode and the second charging mode. The wireless charging device further includes a controller configured to switch between the first charging mode and the second charging mode in response to the input from the sensor.

Another aspect of the subject matter described in the disclosure provides an implementation of a method for wireless charging. The method includes wirelessly transmitting power via a wireless field at a power level sufficient to charge one or more electronic devices according to one or more charging modes. The one or more charging modes includes a first charging mode in which the transmitter is configured to vary the power level of the transmitter based on feedback received from an electronic device of the one or more electronic devices and a second charging mode in which the power level is constant. The method further includes receiving input, via a sensor, for switching between the first charging mode and the second charging mode. The method further includes selectively switching between the first charging mode and the second charging mode in response to the input received via the sensor.

Yet another aspect of the subject matter described in the disclosure provides a wireless charging device. The wireless charging device includes means for wirelessly transmitting power via a wireless field at a power level sufficient to charge one or more electronic devices according to one or more charging modes. The one or more charging modes including at least a first charging mode in which the transmitting means is configured to vary the power level of the transmitting means based on feedback received from an electronic device of the one or more electronic devices and a second charging mode in which the power level is constant. The wireless charging device includes means for receiving input for switching between the first charging mode and the second charging mode. The wireless charging device further includes means for switching between the first charging mode and the second charging mode in response to the input.

BRIEF DESCRIPTION OF THE DRAWINGS

FIGS. 7A and 7B are schematic diagrams of exemplary receive circuits that may be found in small electronic devices, in accordance with exemplary embodiments of the invention.

Figure 1:
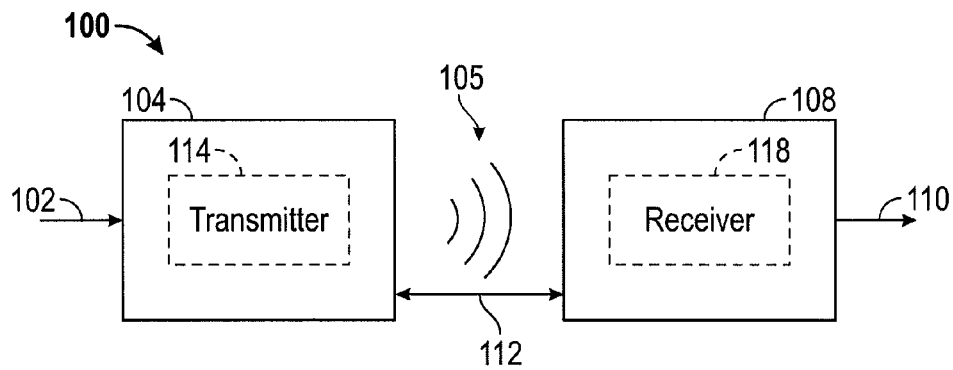
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 include resonant structures and are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
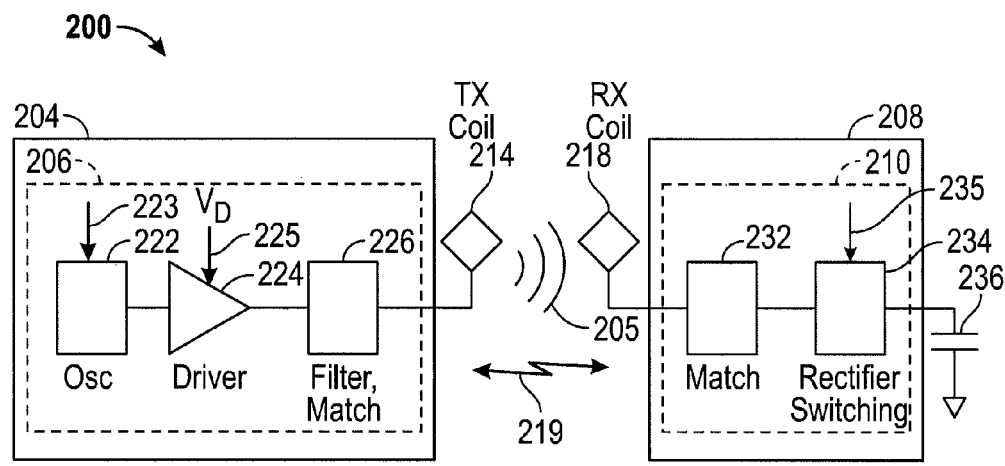
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliwatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc.). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
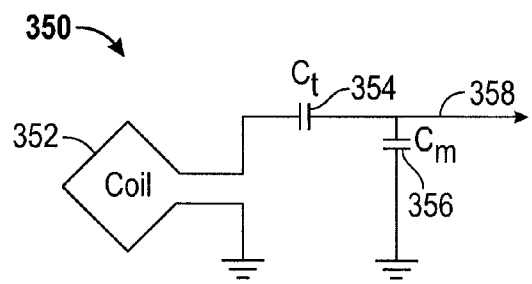
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" is intended to refer to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
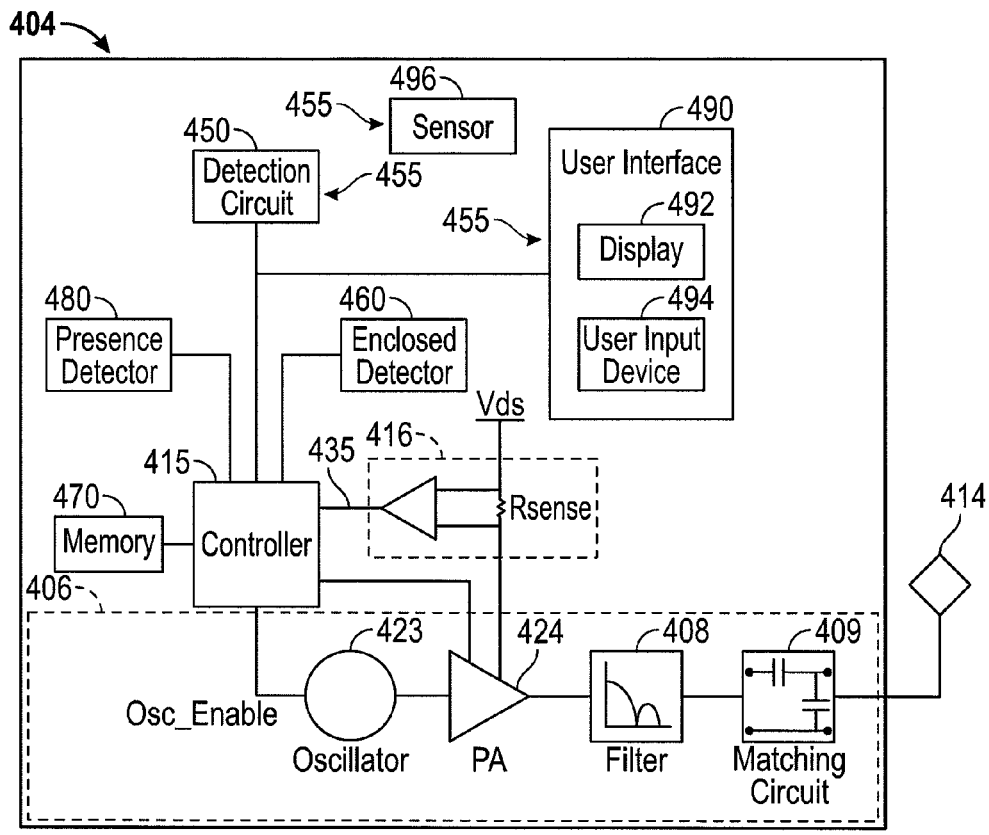
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmitter 404 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmitter 404 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmitter 404 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

The transmitter 404 may further include one or more sensors 455 configured to obtain input. In an embodiment, the input, for example, may be related to determining a mode of operation of the transmitter 404 such as a charging mode. The one or more sensors 455 may include a user interface 490. The user interface 490 may allow for receiving input from a user. The user interface 490 may include a display 492 configured to display, for example, information relating to charging devices. The user interface 490 may also include a user input device 494 configured to receive a user input. For example, the user input device 494 may be configured as a mechanical input comprising at least one of a button, a switch, a key, or the like. The user input device 494 may also be a keyboard, rollerball, mouse, voice recognition system or other device capable of transmitting information from a user to a computer. The user input device 494 can also be a touch screen associated with the display 492, in which case the user responds to prompts on the display 492 by touching the display 492. The user may enter textual information through the input device 494 such as the keyboard or the touch-screen.

The one or more sensors 455 may further include a detection circuit 450 configured to detect one or more devices in proximity to the transmitter 404. For example, the detection circuit 450 may be an optical detection circuit, configured for example to use infra-red to detect motion. The detection circuit 450 may further be configured as a vibration detection circuit configured to detect a physical placement of an object on a surface of the transmitter 404. Furthermore, the detection circuit 450 may be configured as an acoustic detection circuit configured to detect sound waves at particular frequencies to detect the placement of an object in proximity to the transmitter 404. The detection circuit 450 may be configured to distinguish between certain types of devices. For example, if the detection circuit 405 is configured as an acoustic detection circuit, a particular frequency of sound waves may be used to distinguish certain types of devices. In one aspect, the detection circuit 450 may not require any communication from the device it is detecting such that there is no need for a device to have dedicated communication capabilities.

The one or more sensors 455 may include other sensors such as sensor 496. Sensor 496 may be configured to obtain input from a user or otherwise to provide input for changing operation of the transmitter 404. For example, sensor 496 may be any mechanical input such as a button, switch, or key that may be triggered by a user.

Figure 5:
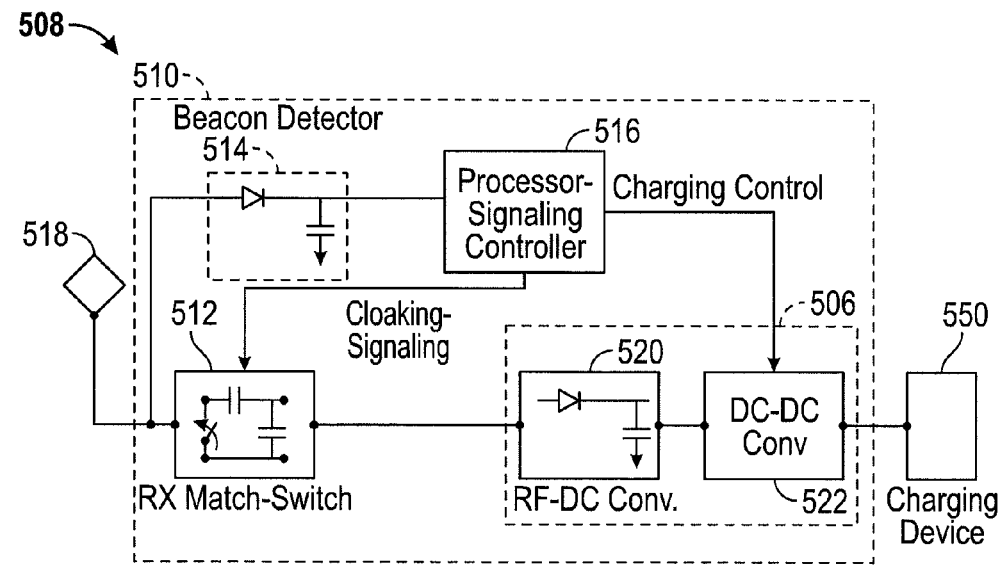
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

A transmitter 404 (FIG. 4) may be configured to charge a variety of different types of receivers with different power requirements and capabilities. For example, as described above, a receiver 508 may include circuitry to allow communicating with a transmitter 404. The receiver 508 may be able to provide feedback regarding the amount of power needed by the receiver 508 along with the amount of power being received 508 in addition to a variety of other information relating to charging. This information may allow a transmitter 404 to adjust and vary power levels to provide charging at maximum efficiency and/or as desired by the receiver 508. As such a variety of types of receiver with different power requirements and battery sizes may be charged. It is noted that the receiver 508 also include dedicated RF communication circuitry (not shown) for communicating with the transmitter 404. For example, the receiver 508 may include a communications circuit and antenna for communicating with the transmitter 404 via Bluetooth.

In some embodiments, the receiver 508 may be a small battery powered device that also requires periodic battery replacement or recharging. For example, the receiver 508 may be a device such as a heart rate monitor, biometric sensor, keyfob transmitter, keychain flashlight, hearing aid, and the like. These small electronic devices may be sealed for protection against water, humidity, sweat, contamination, and the like. This may make it difficult to incorporate a battery door or a charger connection. As such, incorporating wireless power receive circuitry as described above with reference to FIG. 5 into these small electronic devices may be highly desirable. However, the small electronic devices may be too small to incorporate communications systems. As such, the small electronic devices may not be able to communicate with a transmitter 404 for adjusting power levels etc. As such, it may be difficult to charge these devices with a wireless power transmitter 404 that relies on feedback from the receiver 508 for charging devices since the device will not provide the required feedback for normal system operation.

As such, certain embodiments described herein are directed to providing various charging modes that allow for charging small electronic devices. For example, according to one embodiment, a manual charging mode is provided for a transmitter 404 that provides a no-communication charge that would last a fixed period of time. This period may be chosen to allow a full charge of most small electronic devices without damaging the small electronic devices.

Figure 6:
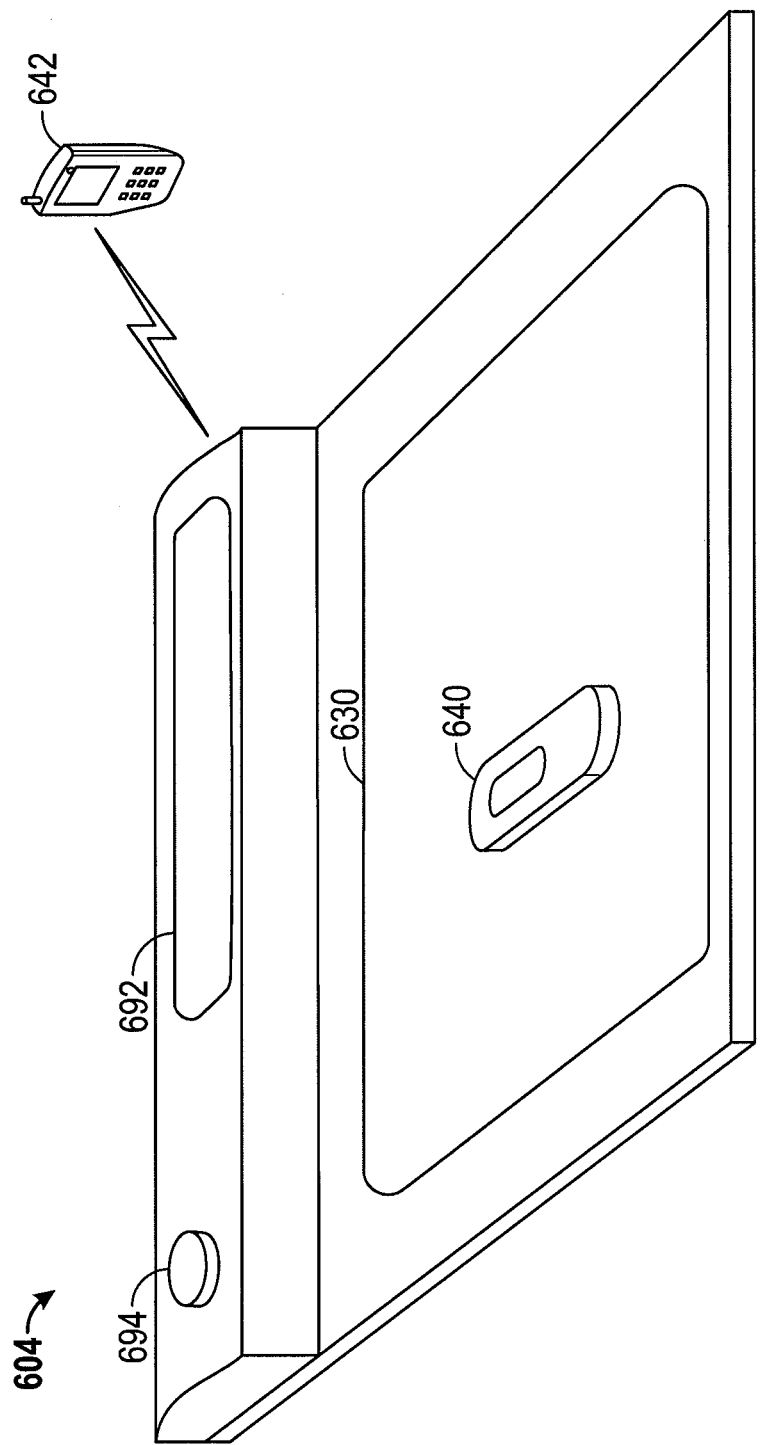
FIG. 6 is diagram of an exemplary wireless charging device, in accordance with exemplary embodiments of the invention.

FIG. 6 is diagram of an exemplary wireless charging device 604, in accordance with exemplary embodiments of the invention. The wireless charging device 604 may be configured as or include the transmitters as described above such as the transmitter 404 of FIG. 4 (or any combination of the components of FIGS. 1-4). The wireless charging device 604 may be configured as a charging pad configured to receive devices within a charging area 630. For example, a small electronic device 640 may be positioned within the charging area 630 of the wireless charging device 604. The wireless charging device 604 further includes a display 692 and a user input device 694, for example such as one of the user input devices as described above. As described above, the wireless charging device 604 is configured to wirelessly transmit power via a wireless field at a power level sufficient to charge one or more electronic devices. The wireless charging device 604 is configured to operate according to one or more charging modes. In a first charging mode, the wireless charging device 604 is configured to vary the power level based on feedback received from an electronic device (not shown).

In addition to the first charging mode, a second charging mode is provided that wirelessly transmits power at a constant power level. This second mode may be used, for example, to charge a small electronic device 640 that may not have the capabilities of communicating with the wireless charging device 604. In this second mode, the wireless charging device 604 may choose an intermediate power level intended to provide a reasonable level of charge without transmitting too much power into a potentially empty pad (for example, if the small electronic device 640 is removed while operating in the second mode). In the second mode, the wireless charging device 604 outputs power at the constant power level for a fixed period of time to allow for fully charging most types of small electronic devices.

In addition to not being able to communicate with the wireless charging device 604, the small electronic device 640 may not have the capability of regulating the power received and may have to deal with a wider range of receiver voltages. For example, a small electronic device 640 may have small batteries and not require significant amounts of current for charging. For example a small electronic device 640 may require somewhere on the order of 500 milliwatts of power (as compared to a more typical larger device that might require power on the order of 5 watts). In one aspect, as the power levels are so low, efficiency may not be as important, as the lower power levels may result in less heating even with less efficient operation. As such, in the second mode, the power level provided by the wireless charging device 604 may be on the order of 1 watt or less.

There may be a variety of different ways for triggering the second charging mode. For example, in one embodiment, the second charging mode may be a manual mode that is triggered by input from one or more sensors 455 that is configured to obtain input for switching between the first charging mode and the second charging mode The controller 415 (FIG. 4) switches between the first charging mode and the second charging mode in response to the input from the sensor. For example, the sensor may be a user input device 694 that may be configured as a button that when pressed triggers the controller 415 (FIG. 4) to switch to the second charging mode, to cause the wireless charging device 604 to output a constant level of power for a fixed period of time. As described above, the user input device 694 could also be a switch, key on a keypad, or any other mechanical input device. In addition or alternatively, the display 692 may be configured to display a selection for the second charging mode. The user input device 694 may be configured to select the mode shown on the display 692 to trigger the controller 415 to switch to the second mode. For example, as noted above, the user input device 694 may be configured as a touch screen over the display 692 to enable selection of the second mode.

In another embodiment, the one or more sensors 455 may include the detection circuit 450 (FIG. 4) that is used to detect the proximity of the small electronic device 640 on the wireless charging device 604 and cause the controller 415 to switch to the second charging mode in response to the input from the sensor. For example, as described above, the detection circuit 450 may be an optical detection circuit, configured for example to use infra-red to detect motion, a vibration detection circuit, an acoustic detection circuit, or the like. In one embodiment, the detection circuit 450 may be configured to distinguish between the small electronic device 640 and other electronic devices so as only to trigger the second charging mode when a small electronic device 640 is detected. The detection circuit 450 may allow for detecting that a small electronic device 640 would need to trigger the second charging mode without requiring any identifying communication from the small electronic device 640.

In another embodiment, the wireless charging device 604 may be able to communicate with other external electronic devices such as the external electronic device 642 shown in FIG. 6. In this case, the external electronic device 642 may receive user input or other input and transmit an indication to the wireless charging device 604 to trigger the controller 415 to switch to the second charging mode.

When the wireless charging device 604 operates in the first charging mode, there may be no electronic devices placed in proximity to the wireless charging device 604. As such, according to the first mode, as described above, the wireless charging device 604 may be configured to enter into a search state. In some cases, this search state may correspond to a lower power state where the wireless charging device 604 periodically provides power at low levels (e.g., 20% of normal power levels). A receiver 508 may receive power from these periodic power transmissions and send an indication to the wireless charging device 604 to enter into a higher power state and initiate communication with the receiver 508. After initiating communication, the wireless charging device 604 may be configured to vary the power level as described above based on feedback received from the receiver 508.

When the controller 415 switches to the second charging mode in response to input from one or more sensors 455, the wireless charging device 604 may exit the search state and provide power at a constant level for a fixed period. Furthermore, after the fixed period the controller 415 may automatically switch to the first charging mode and enter into the search state.

In addition, while in the second charging mode, a more standard electronic device (not shown) may be placed on the pad that allows for communication with the wireless charging device 604. In one embodiment, the controller 415 may be configured to switch back to the first charging mode. In this case, the small electronic device 640 may use whatever power levels the other electronic device demanded of the wireless charging device 604. If the other electronic device was removed, the wireless charging device 604 may actively or passively detect the removal and may switch back into the second charging mode or be switched back to the second charging mode according to one of the schemes described above.

FIGS. 7A and 7B are schematic diagrams of exemplary receive circuits that may be found in small electronic devices (e.g., the small electronic device 640), in accordance with exemplary embodiments of the invention. FIG. 7A shows a power receive circuit 708a including an antenna circuit 702a configured to wireless receive power as it generates current in the presence of an alternating magnetic field. A rectifier 704a is further provided to convert the alternating current generated in the antenna circuit 702a to direct current. The current is regulated by a simple linear regulator (shown as a low-dropout (LDO) regulator 706a) with the receive circuit 708a configured to present a voltage to the regulator with some margin over the output voltage. For example, a small lithium ion battery 710 that may need 4.2 volts may use a linear regulator that accepted 6 volts and could tolerate voltages between 4.5 and 18 volts. This may provide for a very simple receive circuit that could be incorporated into a small electronic device 640. The receive circuit 708a may allow for being able to accept a wide range of power from a wireless charging device 604 (FIG. 6). This may allow for operating according to the second charging mode as described above or other charging modes where there may be no communication with the small electronic device 640.

FIG. 7B shows another power receive circuit 708b that may be used if higher efficiency is required. As shown in FIG. 7A, the power receive circuit 708b of FIG. 7B includes an antenna circuit 702b and a rectifier 704b. The power receive circuit 708b includes a switching power supply 706b. For example, a buck converter may be used for the switching power supply 706b. This would provide a more efficiently regulated voltage to the battery 706b. While providing more efficiency, the power supply 706b may require higher cost and more space. However, in each of FIGS. 7A and 7B simplified power receive circuitry may be used. In this case the second mode may be adapted to provide a fixed power level sufficient for use with these power receive circuits 708a and 708b for providing a full charge without damaging the small electronic devices.

Figure 8:
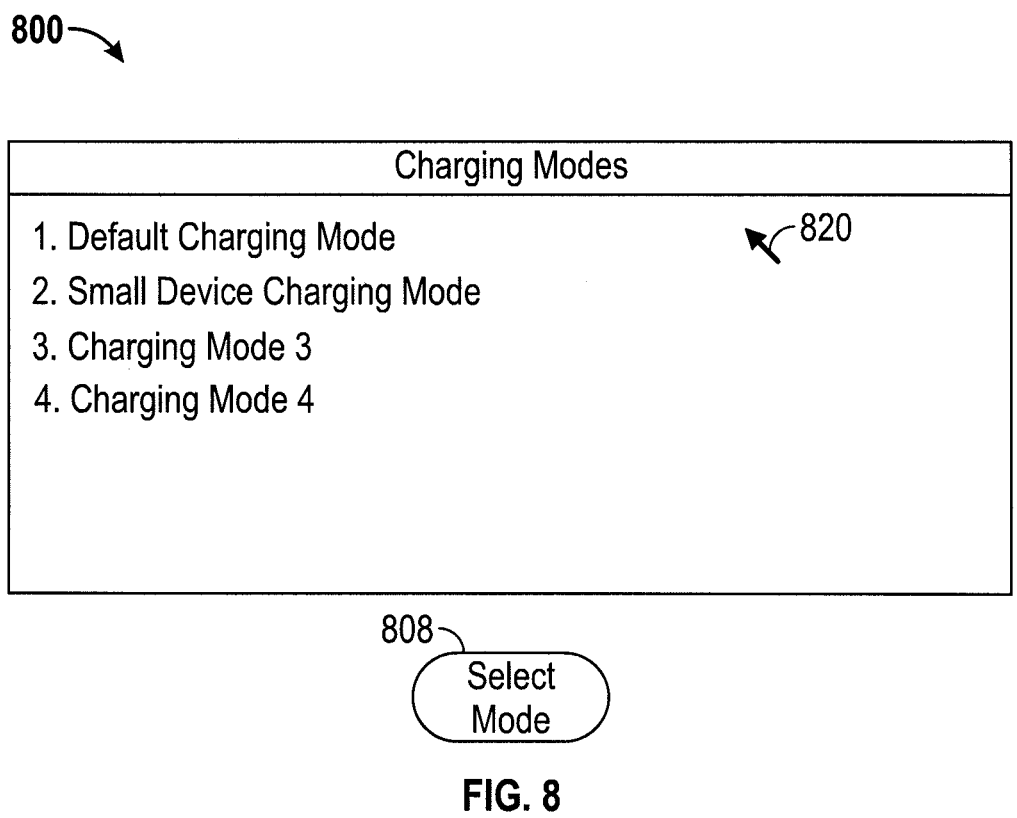
FIG. 8 is a diagram of an exemplary user interface that may be displayed on the wireless charging device of FIG. 6, in accordance with exemplary embodiments of the invention.

FIG. 8 is a diagram of an exemplary user interface 800 that may be displayed on the wireless charging device of FIG. 6, in accordance with exemplary embodiments of the invention. The user interface 800 may be displayed on the display 692 and allow interaction from a user input device 694. The user interface 800 may display any number of possible charging modes. For example, the charging modes displayed may include a default charging mode which may correspond to the first charging mode described above. The user interface 800 may further display a selection for small device charging mode which may correspond to the second charging mode as described above. Other charging modes may also be displayed. An indicator 820 may be provided for selecting one of the charging modes. In some embodiments, a touch screen may be used rather than the indicator 820 or other suitable methods for selecting a charging mode displayed on the display 692 as described above. A button 808 or other mechanism may further be provided to select the mode.

As described above, in other embodiments, the user interface 800 may include only a button or other mechanical input to trigger the second charging mode without including a display 692.

Figure 9:
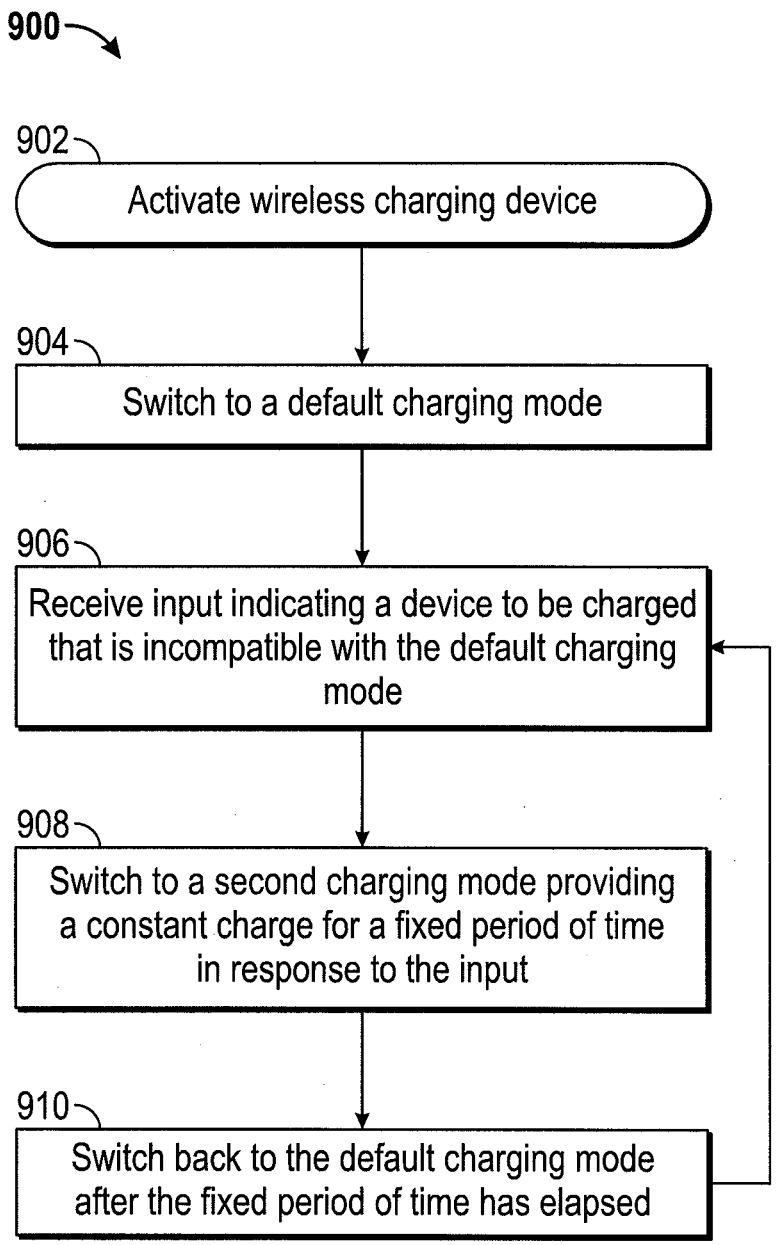
FIG. 9 is a flow chart of an exemplary method for charging electronic devices according to different charging modes, in accordance with exemplary embodiments of the invention.

FIG. 9 is a flow chart of an exemplary method 900 for charging electronic devices according to different charging modes, in accordance with exemplary embodiments of the invention. At block 902, the wireless charging device 604 is activated. For example, a user might turn on the wireless charging device 604 or connect the wireless charging device 604 to power source. At block 904, the wireless charging device 604 may switch to a default charging mode. The default charging mode may correspond to the first charging mode as described above. In this mode, the wireless charging device 604 may be configured to vary power levels based on feedback from an electronic device(s) that is being charged.

At block 906, the wireless charging device 604 may receive input via a one or more sensors 455 indicating a device to be charged that is incompatible with the default charging mode. For example, the device may be a small electronic device 640 as described above that may not be able to communicate with the wireless charger. In some embodiments, the device may be any device that may be able to wirelessly receive power but may not be able to communicate with the wireless charging device 604. In another embodiment, the device to be charged may have different or fixed power requirements not compatible with the default charging mode even though it may be able to communicate with the wireless charging device 604. As such, a variety of types of chargeable devices may make use of the second charging mode other than just the small devices as described above.

The input may be user input and may be received as described above, via a user input device 694 as assisted in some embodiments by a display 492. At block 908, a controller 415 of the wireless charging device 604 switches to a second charging mode that provides a constant charge for a fixed period of time. At block 910, the wireless charging device 604 may switch back to the default charging mode after the fixed period of time has elapsed.

Figure 10:
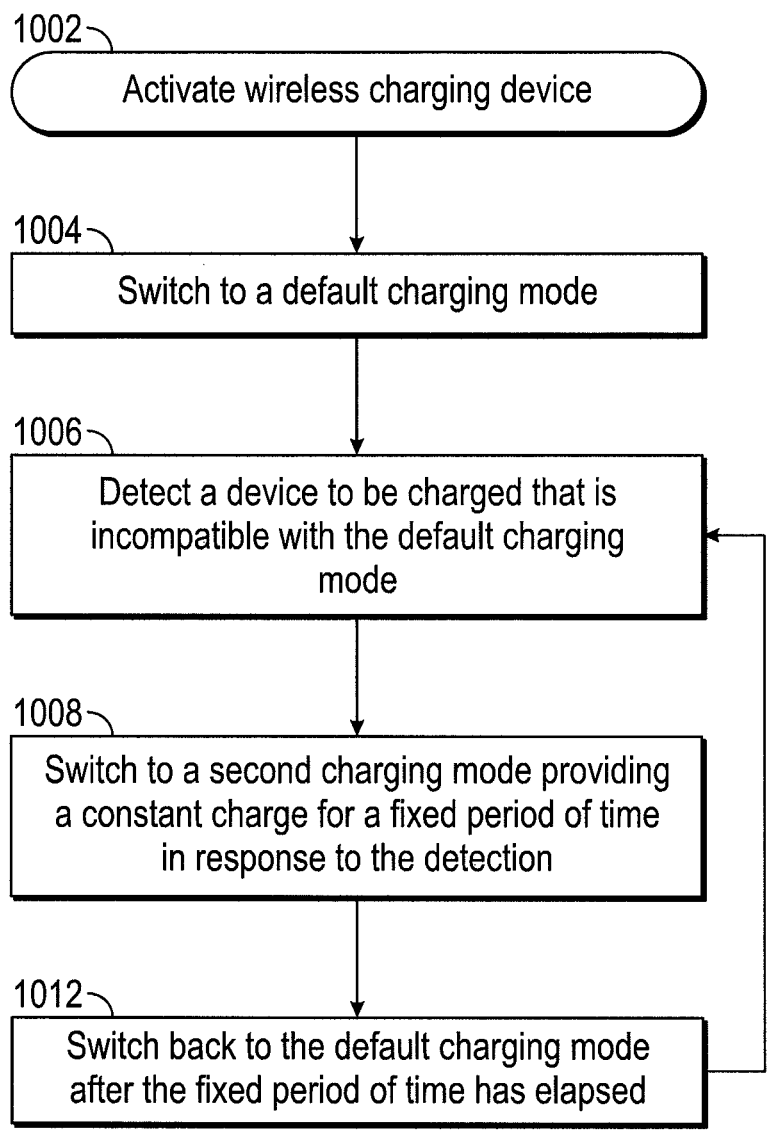
FIG. 10 is a flow chart of another exemplary method for charging electronic devices according to different charging modes, in accordance with exemplary embodiments of the invention.

FIG. 10 is a flow chart of another exemplary method 1000 for charging electronic devices according to different charging modes, in accordance with exemplary embodiments of the invention. At block 1002, the wireless charging device 604 is activated as described above. At block 1004, the wireless charging device 604 may switch to a default charging mode. The default charging mode may correspond to the first charging mode as described above. In this mode, the wireless charging device 604 may be configured to vary power levels based on feedback from an electronic device(s) that is being charged.

At block 106, one or more sensors 455 such as a detection circuit 450 (FIG. 4) of the wireless charging device 604 may detect a device to be charged that is incompatible with the default charging mode. For example, the device may be a small electronic device 640 as described above that may not be able to communicate with the wireless charging device 604. As also described above, in some embodiments, the device may be any device that may be able to wirelessly receive power but may not be able to communicate with the wireless charger. In another embodiment, the device to be charged may simply have different or fixed power requirements not compatible with the default charging mode. As such, a variety of types of chargeable devices may make use of the second charging mode other than just the small devices as described above.

The detection circuit 450 may detect the device as described above using optical, vibrational, acoustical detection and the like. In another embodiment, detection may include receiving a user input as described above. At block 1008, the wireless charging device 604 switches to a second charging mode that provides a constant charge for a fixed period of time in response to the detection. At block 1010, the wireless charging device 604 may switch back to the default charging mode after the fixed period of time has elapsed.

Figure 11:
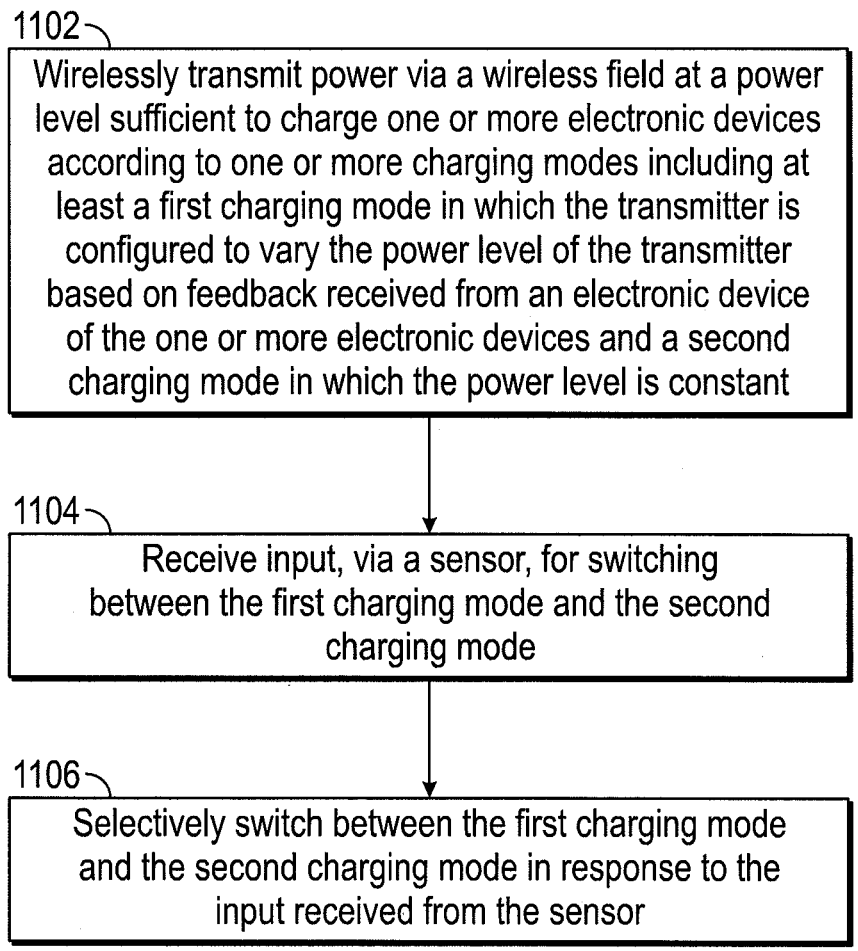
FIG. 11 is a flow chart of another exemplary method for charging electronic devices according to different charging modes, in accordance with exemplary embodiments of the invention.

FIG. 11 is a flow chart of another exemplary method 1100 for charging electronic devices according to different charging modes, in accordance with exemplary embodiments of the invention. At block 1102, power is wirelessly transmitted via a wireless field at a power level sufficient to charge one or more electronic devices according to one or more charging modes. The one or more charging modes include at least a first charging mode in which the transmitter is configured to vary the power level of the transmitter based on feedback received from an electronic device of the one or more electronic devices and a second charging mode in which the power level is constant. The power may be wirelessly transmitted from a wireless charging device 604. At block 1104, input is received via a sensor for switching between the first charging mode and the second charging mode. The sensor may be one of the one or more sensors 455 as described above. At block 1106, a controller 415 may selectively switch between the first charging mode and the second charging mode in response to input from the sensor. As described above, the controller 415 may be configured to selectively switch based on a user input or a detection of a small electronic device 640. The second charging mode may provide the constant power level for a fixed period of time.

Figure 12:
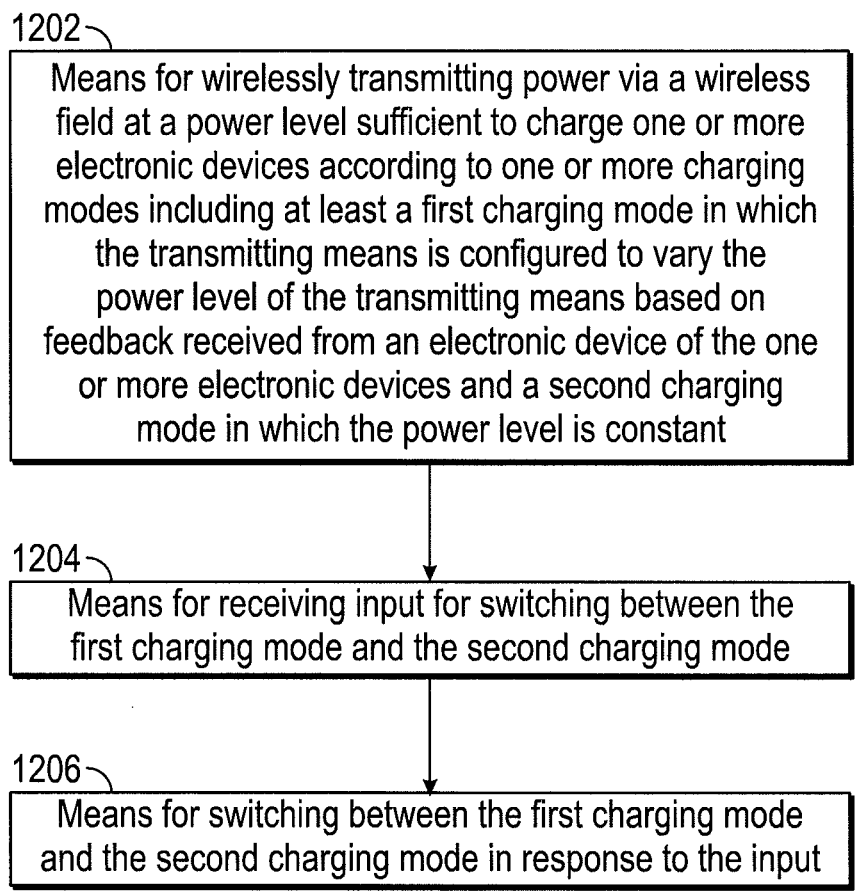
FIG. 12 is a functional block diagram of a wireless charging device, in accordance with an exemplary embodiment of the invention.

FIG. 12 is a functional block diagram of a wireless charging device, in accordance with an exemplary embodiment of the invention. Wireless charging device comprises means 1202, 1204, and 1206 for the various actions discussed with respect to FIGS. 1-11.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a means for wirelessly transmitting power may comprise a transmitter 404. A means for switching between charging modes may comprise a controller 414. A means for detecting may include a detection circuit 450. A means for receiving input may comprise one or more sensors 455.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charging device comprising:
a transmitter configured to wirelessly transmit power via a wireless field at a power level sufficient to charge one or more electronic devices according to one or more charging modes, the one or more charging modes including at least:
a first charging mode in which the transmitter is configured to vary the power level of the transmitter based on feedback received from a first electronic device of the one or more electronic devices, the first electronic device capable of providing the feedback; and
a second charging mode in which the power level is constant for charging second electronic device of the one or more electronic devices, the second electronic device incompatible with charging according to the first charging mode;
a sensor configured to obtain input for switching between the first charging mode and the second charging mode; and
a controller configured to switch between the first charging mode and the second charging mode in response to the input from the sensor.

2. The wireless charging device of claim 1, wherein the transmitter is configured to wirelessly transmit power for a fixed period of time in the second charging mode.

3. The wireless charging device of claim 2, wherein the controller is configured to switch to the first charging mode after the fixed period of time has elapsed.

4. The wireless charging device of claim 1, wherein the power level is less than or equal to one watt in the second charging mode.

5. The wireless charging device of claim 1, wherein the transmitter is configured to operate in a low power mode in the first charging mode when the one or more electronic devices is not detected by the transmitter.

6. The wireless charging device of claim 1, wherein the sensor comprises a user interface configured to receive the input comprising user input, wherein the controller is configured to switch to the second charging mode based on the user input.

7. The wireless charging device of claim 6, wherein the user interface comprises a display configured to display the one or more charging modes.

8. The wireless charging device of claim 1, wherein the sensor comprises a mechanical input comprising at least one of a button, a key, or a switch.

9. The wireless charging device of claim 1, wherein the sensor comprises a receiver configured to receive a user input from an external electronic device, and wherein the controller is configured to switch to the second charging mode based on the user input.

10. The wireless charging device of claim 1, wherein the sensor comprises a detection circuit configured to detect a presence of the one or more electronic devices, wherein the controller is configured to switch to the second charging mode in response to the input indicating a detection of the presence of the one or more electronic devices.

11. The wireless charging device of claim 10, wherein the detection circuit comprises a proximity sensor comprising at least one of an optical detection circuit, a vibration detection circuit, or an acoustic detection circuit.

12. The wireless charging device of claim 1, wherein the transmitter is configured to operate in the second charging mode without any communication between the transmitter and the second electronic device.

13. The wireless charging device of claim 1, wherein the one or more electronic devices comprises at least one of a heart rate monitor, a biometric sensor, a keyfob transmitter, a keychain flashlight, or a hearing aid.

14. The wireless charging device of claim 1, wherein the input comprises an indication to charge the second electronic device of the one or more electronic devices that is incompatible with charging according to the first charging mode.

15. A method for wireless charging comprising:
wirelessly transmitting power via a wireless field at a power level sufficient to charge one or more electronic devices according to one or more charging modes, the one or more charging modes including at least:
a first charging mode in which the power level is varied based on feedback received from a first electronic device of the one or more electronic devices, the first electronic device capable of providing the feedback; and
a second charging mode in which the power level is constant for charging second electronic device of the one or more electronic devices, the second electronic device incompatible with charging according to the first charging mode;
receiving input, via a sensor, for switching between the first charging mode and the second charging mode; and
selectively switching between the first charging mode and the second charging mode in response to the input received via the sensor.

16. The method of claim 15, wherein wirelessly transmitting power according to the second charging mode comprises wirelessly transmitting power for a fixed period of time.

17. The method of claim 16, further comprising switching to the first charging mode after the fixed period of time has elapsed.

18. The method of claim 15, wherein the power level is less than or equal to one watt in the second charging mode.

19. The method of claim 15, wherein wirelessly transmitting power comprises wirelessly transmitting power according to a low power mode in the first charging mode when the one or more electronic devices are not detected.

20. The method of claim 15, wherein the sensor comprises a user interface, and wherein receiving input comprising receiving user input via the user interface, and wherein selectively switching comprises selectively switching to the second charging mode based on the user input.

21. The method of claim 20, wherein the user interface comprises a display configured to display the one or more charging modes.

22. The method of claim 15, wherein the sensor comprises a mechanical input comprising at least one of a button, a key, or a switch.

23. The method of claim 15, wherein the sensor comprises a receiver, and wherein receiving input comprises receiving a user input from an external electronic device via the receiver, and wherein selectively switching comprises switching to the second charging mode based on the user input.

24. The method of claim 15, wherein the sensor comprises a detection circuit, and wherein receiving input comprises receiving input indication a detection of a presence of the second electronic device of the one or more electronic devices via the detection circuit, and wherein selectively switching comprises switching to the second charging mode in response detecting the presence of the second electronic device.

25. The method of claim 24, wherein the detection circuit comprises a proximity sensor comprising at least one of an optical detection circuit, a vibration detection circuit, or an acoustic detection circuit.

26. The method of claim 15, wherein wirelessly transmitting power according to the second charging mode comprises wirelessly transmitting power without any communication with the one or more electronic devices.

27. The method of claim 15, wherein the one or more electronic devices comprises at least one of a heart rate monitor, a biometric sensor, a keyfob transmitter, a keychain flashlight, or a hearing aid.

28. The method of claim 15, wherein receiving input comprises receiving an indication to charge the second electronic device of the one or more electronic devices that is incompatible with charging according to the first charging mode.

29. A wireless charging device comprising:
  means for wirelessly transmitting power via a wireless field at a power level sufficient to charge one or more electronic devices according to one or more charging modes, the one or more charging modes including at least:
    a first charging mode in which the transmitting means is configured to vary the power level of the transmitting means based on feedback received from a first electronic device of the one or more electronic devices, the first electronic device capable of providing the feedback; and
    a second charging mode in which the power level is constant for charging second electronic device of the one or more electronic devices, the second electronic device incompatible with charging according to the first charging mode;
  means for receiving input for switching between the first charging mode and the second charging mode; and
  means for switching between the first charging mode and the second charging mode in response to the input.

30. The wireless charging device of claim 29, wherein the means for wirelessly transmitting power comprises means for wirelessly transmitting power for a fixed period of time in the second charging mode, and wherein the means for switching further comprises means for switching to the first charging mode after the fixed period of time has elapsed.

31. The wireless charging device of claim 29, wherein the means for receiving input comprises at least one of a user interface, a mechanical input, and a presence detection circuit.

32. The wireless charging device of claim 29, wherein the means for wirelessly transmitting power according to the second charging mode comprises means for wirelessly transmitting power without any communication with the one or more electronic chargeable devices.

33. The wireless charging device of claim 29, wherein the means for receiving input comprises means for receiving an indication to charge the second electronic device of the one or more electronic devices that is incompatible with charging according to the first charging mode.

34. The wireless charging device of claim 29, wherein the means for wirelessly transmitting power comprises a wireless power transmitter, and wherein the means for switching comprises a controller.

* * * * *